United States Patent
Park et al.

(10) Patent No.: US 11,183,868 B2
(45) Date of Patent: Nov. 23, 2021

(54) CHARGE CAPACITY VARIABLE CONTROL APPARATUS USING EXTERNAL ENERGY SOURCE AND METHOD THEREOF

(71) Applicants: HYUNDAI MOTOR COMPANY, Seoul (KR); KIA MOTORS CORPORATION, Seoul (KR)

(72) Inventors: Jung-Soo Park, Seoul (KR); Seung-Jae Yum, Seoul (KR); Seung-Wan Son, Suwon-Si (KR); Won-Young Jeong, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 248 days.

(21) Appl. No.: 16/189,219

(22) Filed: Nov. 13, 2018

(65) Prior Publication Data

US 2019/0207414 A1 Jul. 4, 2019

(30) Foreign Application Priority Data

Dec. 28, 2017 (KR) .......................... 10-2017-0182480

(51) Int. Cl.
*H02J 7/35* (2006.01)
*B60K 6/22* (2007.10)
*B60L 53/00* (2019.01)
*B60L 58/12* (2019.01)
*B60L 53/66* (2019.01)
(Continued)

(52) U.S. Cl.
CPC .................. *H02J 7/35* (2013.01); *B60K 6/22* (2013.01); *B60L 53/00* (2019.02); *B60L 53/51* (2019.02); *B60L 53/63* (2019.02); *B60L 53/66* (2019.02); *B60L 58/12* (2019.02); *H02J 7/1446* (2013.01); *B60Y 2200/91* (2013.01); *B60Y 2200/92* (2013.01); *B60Y 2300/91* (2013.01); *H02J 7/0048* (2020.01)

(58) Field of Classification Search
CPC ......................................................... H02J 7/35
USPC .................................................. 320/101, 104
See application file for complete search history.

(56) References Cited

U.S. PATENT DOCUMENTS

| 2014/0095018 A1* | 4/2014 | Atluri ..................... B60L 8/003 |
| | | 701/36 |
| 2016/0244044 A1* | 8/2016 | Miller ................... B60W 20/13 |

(Continued)

FOREIGN PATENT DOCUMENTS

| JP | H07-123510 A | 5/1995 |
| JP | 2007-228753 A | 9/2007 |

(Continued)

*Primary Examiner* — Edward Tso
*Assistant Examiner* — Ahmed H Omar
(74) *Attorney, Agent, or Firm* — Morgan, Lewis & Bockius LLP

(57) ABSTRACT

A charge capacity variable control apparatus using an external energy source for a vehicle, may include an external energy source for generating an external charge power, a main battery for receiving the external charge power to be charged, and a controller for generating a change target charge capacity by changing an existing target charge capacity based on an external charge capacity of the external energy source and a battery charge capacity of the main battery depending upon the driving state of the vehicle, and performing a variable control using the change target charge capacity.

18 Claims, 4 Drawing Sheets

(51) Int. Cl.
     *H02J 7/14*     (2006.01)
     *B60L 53/63*    (2019.01)
     *B60L 53/51*    (2019.01)
     *H02J 7/00*     (2006.01)

(56) References Cited

U.S. PATENT DOCUMENTS

| | | | | |
|---|---|---|---|---|
| 2017/0104343 | A1* | 4/2017 | ElBsat | H02J 7/007 |
| 2017/0274890 | A1* | 9/2017 | Mansur | B60W 10/06 |
| 2017/0324268 | A1* | 11/2017 | Hanada | H02J 3/381 |

FOREIGN PATENT DOCUMENTS

| | | |
|---|---|---|
| JP | 2012-056357 A | 3/2012 |
| KR | 10-1743855 B | 5/2017 |

\* cited by examiner

CHARGE CAPACITY VARIABLE CONTROL APPARATUS USING EXTERNAL ENERGY SOURCE AND METHOD THEREOF

CROSS-REFERENCE TO RELATED APPLICATIONS

This application claims priority to Korean Patent Application No. 10-2017-0182480 filed on Dec. 28, 2017, which is incorporated herein by reference in its entirety.

TECHNICAL FIELD

The present disclosure relates to a charge capacity control technology, and more particularly, to a charge capacity variable control apparatus and a method thereof for variably controlling charge capacity depending upon a driving state and/or a battery state of a vehicle using a solar cell that is an external energy source.

BACKGROUND

Generally, a charge capacity control of a vehicle is a method of controlling a target charge capacity depending upon the states of an engine and a battery, or a driving state (highway/local road/city etc. or flat/climbing/descending). Particularly, in such a control method, a charge source is the charge by an engine or a regenerative brake generated upon vehicle deceleration.

Generally, a charge capacity state is divided into Critical High/High/Normal/Low/Critical Low regions. Here, in the Normal region, a charge/discharge control is performed depending upon optimum efficiency. In the High/Low regions, the discharge is mainly controlled in the High region, and the charge is mainly controlled in the Low region rather than optimum efficiency.

However, there is no charge capacity control for an external energy source, the charge is shifted to the High region outside the Normal region for optimum efficiency, or is excessively performed in the city region of low efficiency.

The contents described in Description of Related Art are to help the understanding of the background of the present disclosure, and may include what is not previously known to those skilled in the art to which the present disclosure pertains.

SUMMARY OF THE DISCLOSURE

The present disclosure is intended to solve the problem, and an object of the present disclosure is to provide a charge capacity variable control apparatus and a method thereof, which can variably control charge capacity depending upon a driving state and/or a battery state of a vehicle using a solar cell that is an external energy source.

In addition, another object of the present disclosure is to provide a charge capacity variable control apparatus and a method thereof that can prevent the charge from being shifted to the High region outside the Normal region for optimum efficiency, or from being excessively performed in the city region of low efficiency.

For achieving the objects, the present disclosure provides a charge capacity variable control apparatus and a method thereof, which can variably control charge capacity depending upon a driving state and/or a battery state of a vehicle using a solar cell that is an external energy source.

A charge capacity variable control apparatus using an external energy source for a vehicle according to an exemplary embodiment of the present disclosure includes: an external energy source for generating an external charge power; a main battery for receiving the external charge power to be charged; and a controller for calculating a change target charge capacity based on an external charge capacity of the external energy source and a battery charge capacity of the main battery depending upon the driving state of the vehicle, and performing a variable control based on the change target charge capacity.

The external energy source can be a solar cell.

The solar cell can be installed on a roof of the vehicle.

The external charge capacity can be a value that can be expressed as a percentage by integrating the power (watt) charged by the external energy source with the time and then being divided by the battery capacity of the main battery.

The variable control can be performed under only the situation in a High region that the external charge capacity and the charge capacity state of the battery charge capacity are equal to or greater than a first reference value and a second reference value that are preset, respectively, or in a Normal region that corresponds to the first reference value and the second reference value.

The variable control cannot be performed under any one of a Full Load situation, an idle charge situation, a situation that enters into the idle charge more than once within one driving cycle, a situation in a Low region that the charge capacity state of the battery charge capacity is equal to or less than the first reference value, and a situation in the Low region that the external charge capacity is equal to or less than the second reference value.

The variable control can extend an electric vehicle (EV) region by setting the change target charge capacity as low as the external charge capacity.

The variable control can perform an ON/OFF period of an engine by a map that is preset to correspond to the change target charge capacity and a vehicle speed.

The controller can use the external charge power only as the battery charge capacity upon the variable control.

The driving state can be any one of a highway driving, a city driving, and a local road driving.

A charge capacity variable control apparatus using an external energy source for a vehicle according to another exemplary embodiment of the present disclosure includes: an external energy source for generating an external charge power; an auxiliary battery for receiving the external charge power to be charged; and a controller for calculating a change target charge capacity based on an external charge capacity of the external energy source and a battery charge capacity of the auxiliary battery depending upon a driving state of the vehicle, and performing a variable control based on the change target charge capacity.

A charge capacity variable control method using an external energy source for a vehicle according to another exemplary embodiment of the present disclosure includes: generating, by an external energy source, an external charge power; receiving, by a main battery, the external charge source to be charged; calculating, by a controller, a change target charge capacity based on an external charge capacity of the external energy source and a battery charge capacity of the main battery depending upon the driving state of the vehicle; and performing, by the controller, a variable control based on the change target charge capacity.

According to the present disclosure, it is possible to change the charge capacity control using the external energy source.

In addition, there is another effect of the present disclosure in that it is possible to prevent the expansion of the Normal region/Electric Vehicle region and the excessive charge in the low efficient section, thus enhancing about 0.5% fuel efficiency on the real road section in summer.

In addition, there is yet another effect of the present disclosure in that it is possible to maintain the existing control in the Full Load/Idle charge sections, thus securing the charge capacity margin to expect the fuel efficiency.

DETAILED DESCRIPTION OF SPECIFIC EMBODIMENTS

Figure 1:
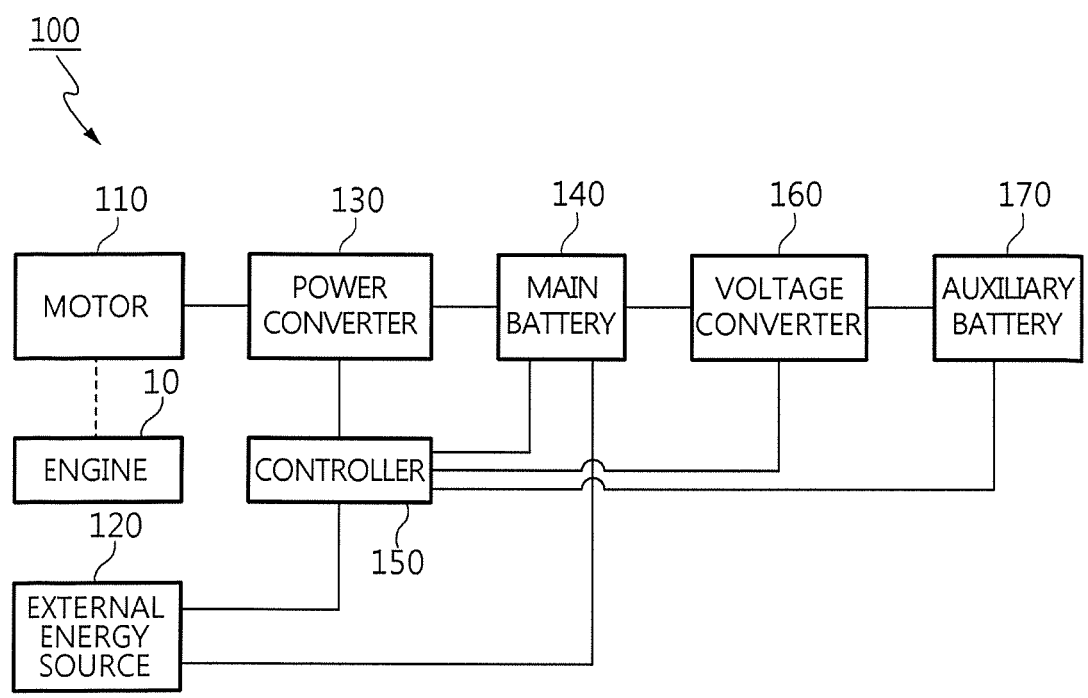
FIG. 1 is a configuration block diagram of a charge capacity variable control apparatus in accordance with an embodiment of the present disclosure.

Various modifications can be made in the embodiments in accordance with the present disclosure, so that specific embodiments are illustrated in the drawings and described in detail in the specification. It should be understood, however, that it is not intended to limit the embodiments in accordance with the concepts of the present disclosure to the particular disclosed forms, but includes all modifications, equivalents, and alternatives falling within the sprit and technical scope of the present disclosure.

Like reference numerals are used for like elements in describing each drawing. The terms "first" and/or "second," and the like are used to illustrate various components, but the components should not be limited by the terms. The terms are used to differentiate one element from another.

For example, a first component can be referred to as a second component, and similarly, the second component can be also referred to as the first component without departing from claims in accordance with the scope of the present disclosure. The terms "and/or" includes a plurality of related listed items or any of a plurality of related listed items.

Unless otherwise defined, all terms including technical and scientific terms used herein have the same meaning as commonly understood by one of ordinary skill in the art to which the present disclosure belongs.

It will be further understood that terms, such as those defined in commonly used dictionaries, should be additionally interpreted as having a meaning that is consistent with their meaning in the context of the relevant art, and will not be interpreted in an idealized or overly formal sense unless expressly so defined in the specification.

Hereinafter, a charge capacity variable control apparatus using an external energy source and a method thereof in accordance with an embodiment of the present disclosure will be described in detail with reference to the accompanying drawings.

FIG. 1 is a configuration block diagram of a charge capacity variable control apparatus 100 in accordance with an embodiment of the present disclosure. Referring to FIG. 1, the charge capacity variable control apparatus 100 can be configured to include an external energy source 120 for generating external charge power, a main battery 140 for receiving the external charge power to be charged, and a controller 150 for generating change target charge capacity by changing target charge capacity based on the external charge capacity of the external energy source and the battery charge capacity of the main battery depending upon a driving state of an eco-friendly vehicle, and performing a variable control using the change target charge capacity.

The charge capacity variable control apparatus 100 further includes an engine 10 and a motor 110 connected as a connection means with the engine 10. The connection means can be a belt or a chain. The engine 10 can be Continuous Variable Valve Timing (CVVT), Double Over Head Camshaft (DOHC), Continuous Valve Timing (CVT), Gasoline Direct Injection (GDI), Multi Point Injection (MPI) engines that use gasoline as a fuel, Common Rail Direct Injection (CRDI), High direction Turbo Intercooler (HTI), Variable Geometry Turbocharger (VGT) engines that use diesel as a fuel, a Liquid Propane injection (LPi) engine that uses gas as a fuel, etc.

The motor 110 can become a Hybrid Starter and Generator (HSG). Accordingly, it starts the engine 10, or receives a rotation force from the engine 10 to generate power. Specifically, the motor 110 recovers kinetic energy of a vehicle as electrical energy by performing a regenerative brake upon vehicle deceleration in addition to the object that drives an electric vehicle itself. That is, an eco-friendly vehicle uses a part of the braking force upon braking for power generation, and uses the generated electrical energy for the battery charge. Specifically, by using a part of the kinetic energy by the driving speed of the vehicle as the energy required for the operation of the generator, it is possible to simultaneously implement the reduction in kinetic energy (i.e., the reduction in the driving speed) and the power-generation of the electrical energy. The braking method is referred to as a Regenerative Braking (RB), and the generation of the electrical energy upon the regenerative braking can be performed by reversely operating a separate generator or the motor.

The external energy source 120 generates the energy separately from the main battery 140. The external energy source can include a solar cell, a manual self-generator, etc. The solar cell is mounted in the panel shape on the roof of the vehicle. It can be also attached to a window using the solar cell of a film shape.

In a general regenerative braking procedure, the controller 150 controls the regenerative braking operation by delivering to the motor 110 a motor regenerative braking current limitation value depending upon a motor torque command value and/or a battery state based on a vehicle speed and/or a brake signal. The motor 110 is illustrated in the drawing, but herein, a motor control unit (MCU) can be also included.

A power converter 130 performs an inverter function. That is, it can output by converting the generated power of three-phase alternating current that generates in the motor 110 into direct current, or conversely, can drive the motor 110 by converting the direct current received from the main battery 140 into the three-phase alternating current. The power converter 130 can be also provided in the motor 110.

The main battery 140 has a battery cell (not shown) arranged in series and/or in parallel, and the battery cell can be a high-voltage battery for electric vehicle such as a nickel metal battery, a lithium ion battery, a lithium polymer battery, and a solid-state battery. Generally, the high-voltage battery, as the battery used as a power source operating the electric vehicle, means the high voltage of 100V or more. However, it is not limited thereto, and a low voltage battery is also possible.

The battery cell can be designed as a cylindrical cell, a prismatic cell, a pouch cell, etc. The pouch cells include a flexible cover composed of a thin film, and the electric components of the battery cell are located in the battery cell. In order to use an optimum space in one battery cell, the pouch cells are used, particularly. The pouch cells also have high capacity and low weight.

Edges of the pouch cells described above include a sealing joint (not shown). Specifically, the sealing joint connects two thin films of the battery cells, and the thin films include additional parts in the common portion formed by it.

The controller 150 generates change target charge capacity by changing target charge capacity based on the external charge capacity of the external energy source and the battery charge capacity of the main battery depending upon a driving state of an eco-friendly vehicle, and performs a variable control using the change target charge capacity. In addition, it is connected with a Hybrid Control Unit (HCU), a Vehicle Control Unit (VCU), etc. to acquire regenerative brake information, etc. depending upon the driving information, the vehicle speed, and the brake operation of the eco-friendly vehicle. The controller 150 can be included in the HCU, the VCU, etc. Herein, the eco-friendly vehicle can be a Hybrid Electric Vehicle (HEV), a fuel cell vehicle, a fuel cell HEV, etc.

An auxiliary battery 170 can also have a battery cell (not shown) arranged in series and/or in parallel similar to the main battery. The auxiliary battery 170 supplies the power to an electric load, etc. such as a lamp. Accordingly, the auxiliary battery 170 receives charge power from the main battery 140 to be charged. For this purpose, a voltage converter 160 for converting the voltage is provided between the main battery 140 and the auxiliary battery 170. The voltage converter 160 generally uses a low voltage Direct Current-Direct Current (DC-DC) converter. The auxiliary battery 170 generally outputs 12V.

Figure 2:
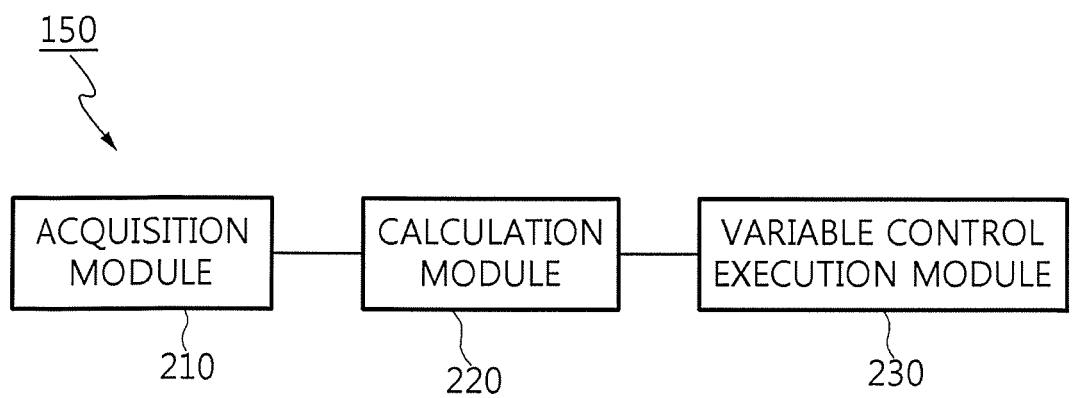
FIG. 2 is a detailed configuration block diagram of a controller illustrated in FIG.

FIG. 2 is a detailed configuration block diagram of the controller 150 illustrated in FIG. 1. Referring to FIG. 2, the controller 150 can be configured to include the main battery 140, an acquisition module 210 for acquiring the battery information of the auxiliary battery 170, a calculation device 220 for generating the change target charge capacity by changing the target charge capacity based on the external charge capacity of the external energy source and the battery charge capacity of the main battery depending upon a driving state of an eco-friendly vehicle using the battery information, and a variable control execution device 230 for performing a variable control using the change target charge capacity.

The terms of "module," etc. denoted in FIG. 2 means a unit that processes at least one function or operation, and this can be implemented by a combination of hardware and/or software.

In addition, the controller 150 herein may refer to an electronic control unit (ECU) for controlling various electrical systems in the vehicle, and the calculation device 220 and the variable control execution device 230 may be hardware devices connected to the controller 150 or embedded in the controller 150 as one control unit.

In implementing the hardware, it can be implemented by an Application Specific Integrated Circuit (ASIC) designed for performing the above function, a Digital Signal Processing (DSP), a Programmable Logic Device (PLD), a Field Programmable Gate Array (FPGA), a processor, a controller, a microprocessor, other electronic units or a combination thereof. In implementing the software, it can be implemented by the module performing the above function. The software can be stored in a memory unit, and performed by the processor. The memory unit or the processor can adopt various means well known to those skilled in the art.

Figure 3:
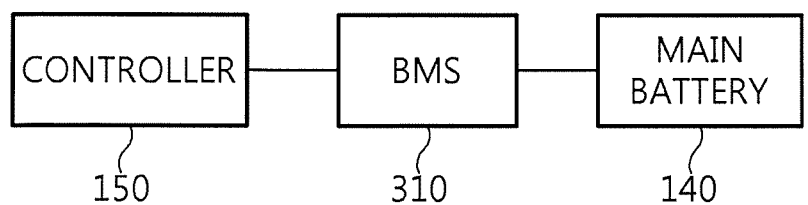
FIG. 3 is a configuration block diagram in which a battery management system (BMS) is provided in a main battery illustrated in FIG. 1.

FIG. 3 is a configuration block diagram in which a battery management system 310 is provided in the main battery illustrated in FIG. 1. Referring to FIG. 3, the BMS 310 is provided between the controller 150 and the main battery 140. The BMS 310 monitors and manages the main battery 140. Particularly, the BMS 310 generates battery state information of the main battery 140, and transmits it to the controller 150. Herein, the battery state information can be any one of State of Charge (SOC), State Of Health (SOH), Depth Of Discharging (DOD), and State of Function (SOF), or a combination thereof. In the embodiment of the present embodiment, the SOC will be described for convenience of understanding.

The BMS can be also provided between the auxiliary battery 170 and the controller 150. Particularly, the BMS can be provided in the main battery 140 and the auxiliary battery 170, respectively.

Figure 4:
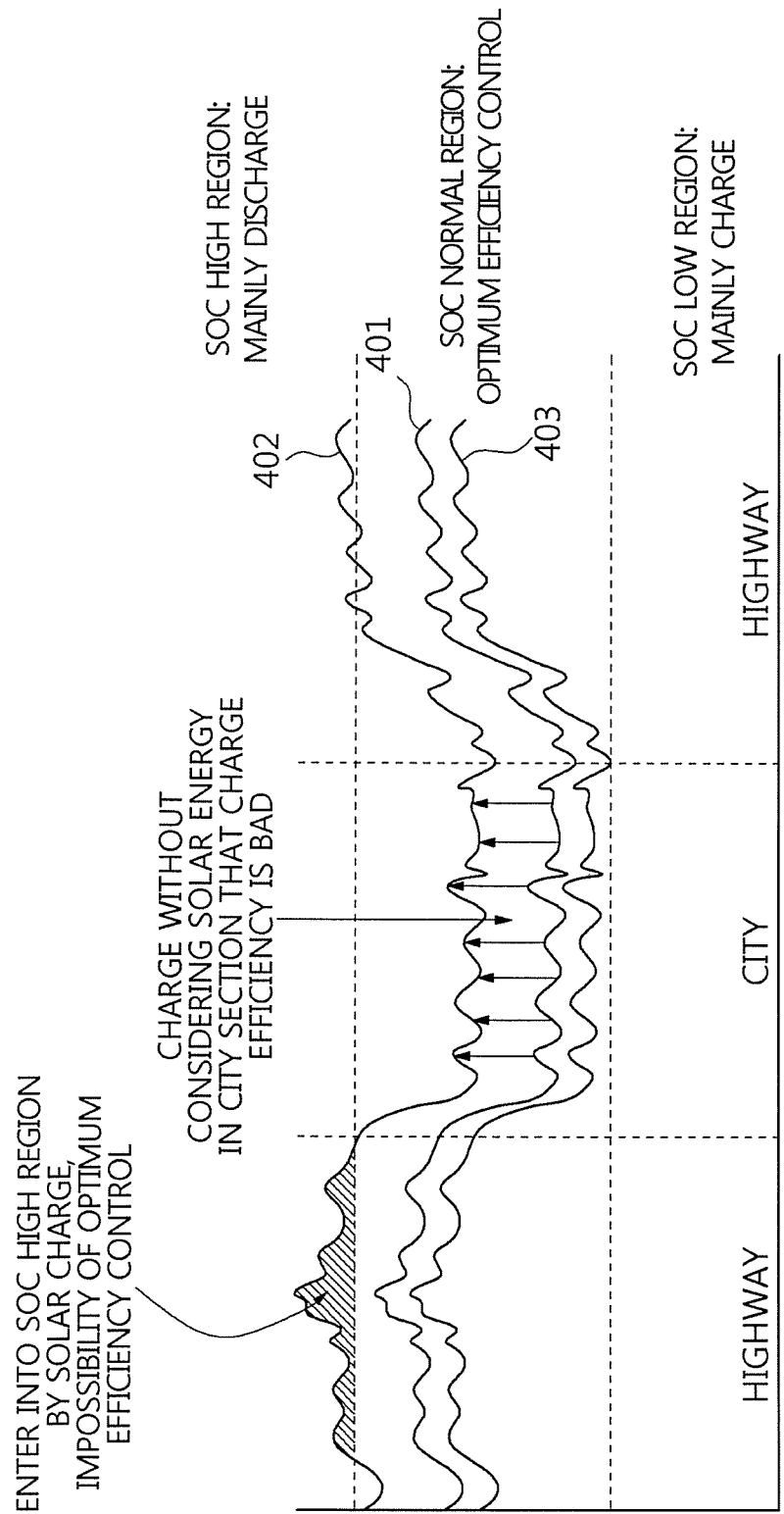
FIG. 4 is a graph illustrating a control theory depending upon an external energy source and a charge capacity of a main battery in accordance with an embodiment of the present disclosure.

FIG. 4 is a graph illustrating a control theory depending upon the external energy source and the charge capacity of the main battery in accordance with the embodiment of the present disclosure. Referring to FIG. 4, in the SOC control curve 402 charged by a solar cell, the SOC High region is entered by the solar cell in a first highway section. That is, an optimum efficiency control for the shaded area is not possible in a SOC Normal region compared with the existing target SOC control curve 401. In addition, in the city section of low charge efficiency, the charge of the main battery is performed without considering the solar cell charge energy. In this case, since there is no concept for charge capacity control charged by the external energy source, the charge is shifted to the High region outside the Normal region for optimum efficiency, or is excessively performed in the city region of low efficiency.

Accordingly, in the present disclosure, a change target SOC control curve 403 is generated by reflecting the external energy source and the driving state to set as low as the SOC generated by the solar cell in the existing target SOC control curve 401.

Accordingly, the variable control can be performed based on the change target SOC control curve 403. That is, the variable control is performed only in the situation in the High region that the external charge capacity and the charge capacity state of the battery charge capacity is equal to or greater than a first reference value and a second reference value that are preset, respectively, or in the Normal region corresponding to the first reference value and the second reference value.

The variable control is not performed in the situation in the Low region that the charge capacity state of the battery charge capacity is equal to or less than the first reference value, and in the situation in the Low region that the external charge capacity is equal to or less than the second reference value. This is summarized by Table 1 below.

TABLE 1

| Battery charge capacity state | Solar charge capacity state | | |
| --- | --- | --- | --- |
| | High | Normal | Low |
| High | Extend EV region by lowering target charge capacity | Extend EV region by lowering target charge capacity | No variable control |

TABLE 1-continued

| Battery charge capacity state | Solar charge capacity state | | |
|---|---|---|---|
| | High | Normal | Low |
| Normal | Extend EV region by lowering target charge capacity | Extend EV region by lowering target charge capacity | No variable control |
| Low | No variable control | No variable control | No variable control |

Herein, a charge/discharge control is performed depending upon optimum efficiency in the Normal region. In addition, in the High/Low regions, the discharge is mainly controlled in the High region and the charge is mainly controlled in the Low region rather than the optimum efficiency.

Specifically, if the external charge capacity state (i.e., the solar cell charge capacity state) and the battery charge capacity state belong to any one of the High and Normal regions, the Electric Vehicle region is extended by lowering the setting of the target charge capacity mainly by the discharging. If both the external charge capacity state (i.e., the solar cell charge capacity state) and the battery charge capacity state belong to the Low region, the variable control by the solar charge mainly by the charge is not performed and the charge is mainly performed.

Figure 5:
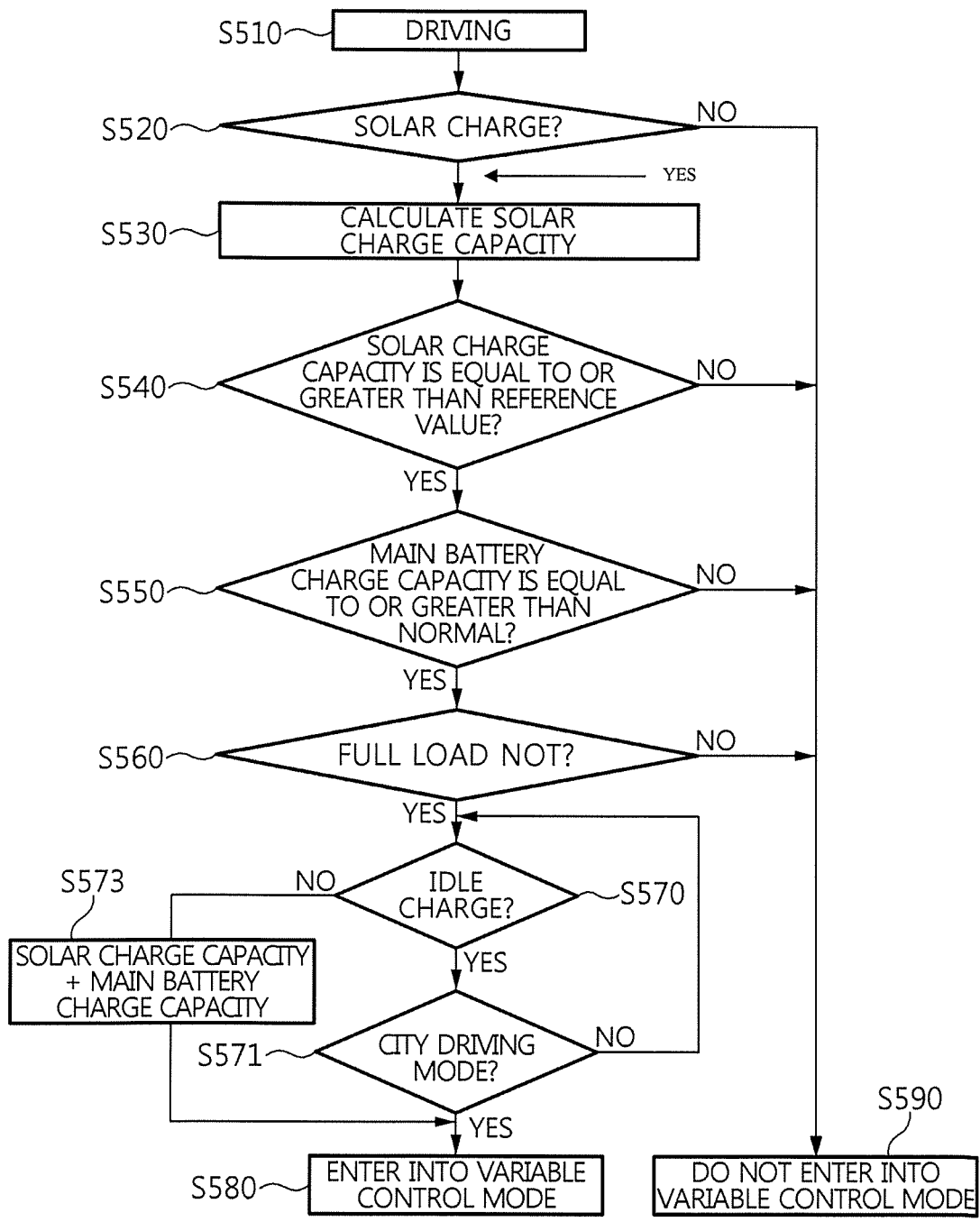
FIG. 5 is a flowchart illustrating a charge capacity variable control procedure in accordance with an embodiment of the present disclosure.

FIG. 5 is a flowchart illustrating a charge capacity variable control procedure in accordance with the embodiment of the present disclosure. Referring to FIG. 5, it is confirmed whether the solar charge has been performed during the vehicle driving S510, S520.

In the S520, if the solar charge is not performed, the variable control mode is not entered and the existing target charge capacity control is performed S590.

On the other hand, in the S520, if the solar charge is performed, the solar charge capacity (i.e., the external charge capacity) is calculated S530. The external charge capacity is calculated through the following equation.

$$SOC_{Solar} = \frac{\int W_{Solar} dt}{Ah_{Battery}} \times 100 \qquad \text{Equation 1}$$

Herein, the $SOC_{solar}$ refers to the solar charge capacity which is an amount of State of Charge charged by the solar cell, the
$Ah_{Battery}$ refers to the battery capacity, and the $W_{solar}$ refers to the power (watt) charged by the solar cell.

Accordingly, the charge capacity can be expressed as a percentage by integrating the power (watt) charged by the external energy source with the time and then being divided into the battery capacity of the main battery.

If the solar charge capacity is calculated, it is confirmed whether the solar charge capacity is equal to or greater than the reference value that is preset, and whether the charge capacity of the main battery is equal to or greater than the normal S540, S550. If the condition in the S540, S550 is not satisfied, the variable control mode is not entered and the existing target charge capacity control is performed S590.

On the other hand, if the condition is satisfied in the S540, S550, it is confirmed whether it is not in the Full load situation S560. That is, if a high electric load such as a motor is used, the variable control is not performed.

If it is in the Full load situation in the S560, the variable control mode is not entered and the existing target charge capacity control is performed S590. On the other hand, if it is not in the Full load situation in the S560, it is determined whether the vehicle is in an idle charge situation S570.

If it is not in the idle charge situation in the S570, the main battery charge capacity is added to the solar charge capacity, and the variable control mode is entered S573, S580.

On the other hand, if it is in the idle charge situation in the S570, it is confirmed whether it is in the city driving mode, and if it is in the city driving mode, the variable control mode is not entered S571, S572. Then, the S570 and S571 proceed. Specifically, if the situation occurs in which the idle charge is entered more than once within one drive cycle, the vehicle does not enter into the variable control mode. Here, a cancellation condition is when escaping the city driving situation. That is, if it is not in the city driving mode in the S571, the S580 proceeds.

That is, the variable control is performed depending upon the charge capacity predicted in the states of the existing highway, local road, Full load, idle charges, etc. Herein, the variable control is to control the ON/OFF period of the engine (10 in FIG. 1), and performed by a map that is preset to correspond to the change target charge capacity and the vehicle speed. The map is determined by an experimental value and is designed as an algorithm to be stored in the controller 150.

Upon the variable control, it is possible to use the external charge power as only the battery charge capacity.

FIGS. 1 to 5 illustrate the efficient variable control using the main battery and the external energy source, but it is possible to also apply the efficient variable control using the auxiliary battery and the external energy source other than the main battery in the same way.

In addition, the steps of the method or the algorithm explained regarding the embodiments disclosed herein are implemented as a program command format that can be performed through various computers means to be recorded in a computer readable medium. The computer readable medium can include a program (command) code, a data file, a data structure, etc. separately or a combination thereof.

The program (command) code recorded in the medium can be the ones specially designed or configured for the present disclosure, or can be the one known and available to those skilled in the computer software. Examples of the computer readable medium can include a magnetic media such as a hard disk, a floppy disk, and a magnetic tape, an optical media such as a CD-ROM, a DVD, and a Blue ray, and a semiconductor storage device specially configured to store and perform a program (command) code such as a ROM, a RAM, and a flash memory.

Herein, examples of the program (command) code include a high-level language code that can be executed by a computer using an interpreter, etc., as well as a machine language code made such as those produced by a complier. The hardware device can be configured to operate as one or more software modules in order to perform the operation of the present disclosure, and vice versa.

What is claimed is:

1. A charge capacity variable control apparatus using an external energy source for a vehicle, comprising:
   an external energy source for generating an external charge power;
   a main battery for receiving the external charge power to be charged; and
   a controller for calculating a change target charge capacity based on an external charge capacity of the external energy source and a battery charge capacity of the main battery depending upon a driving state of the vehicle, and performing a variable control based on the change target charge capacity, wherein the variable control is performed under a situation in a high region in which each of an external charge amount and a charge amount state of a battery charge amount are equal to or greater than a first reference value and a second reference value, respectively, or a situation in a normal region in which the external charge amount and the charge amount state of the battery charge amount are equal to the first reference value and the second reference value, respectively.

2. The charge capacity variable control apparatus of claim 1, wherein the external energy source is a solar cell.

3. The charge capacity variable control apparatus of claim 2, wherein the solar cell is disposed on a roof of the vehicle.

4. The charge capacity variable control apparatus of claim 1, wherein the external charge capacity is a value that is expressed as a percentage by integrating the external charge power charged by the external energy source with a time and then dividing by the battery charge capacity of the main battery.

5. The charge capacity variable control apparatus of claim 1, wherein the variable control is not performed under any one of a full load situation, an idle charge situation, a situation that enters into the idle charge situation more than once within one driving cycle, a situation in a low region that the charge amount state of the battery charge capacity is equal to or less than the second reference value, and the situation in the low region that the external charge capacity is equal to or less than the first reference value.

6. The charge capacity variable control apparatus of claim 1, wherein the variable control extends an electric vehicle (EV) region by reducing the change target charge capacity to be same as the external charge capacity.

7. The charge capacity variable control apparatus of claim 1, wherein the variable control performs an ON/OFF period of an engine by a map that is preset to correspond to the change target charge capacity and a vehicle speed.

8. The charge capacity variable control of claim 1, wherein the controller uses the external charge power only as the battery charge capacity upon the variable control.

9. The charge capacity variable control apparatus of claim 1, wherein the driving state is any one of a highway driving, a city driving, and a local road driving.

10. A charge capacity variable control apparatus using an external energy source for a vehicle, comprising:
an external energy source for generating an external charge power;
a main battery for receiving the external charge power to be charged;
an auxiliary battery for receiving the external charge power to be charged; and
a controller for calculating a change target charge capacity based on an external charge capacity of the external energy source and a battery charge capacity of the auxiliary battery depending upon a driving state of the vehicle, and performing a variable control based on the change target charge capacity,
wherein the variable control is performed under a situation in a high region in which each of an external charge amount and a charge amount state of a battery charge amount are equal to or greater than a first reference value and a second reference value, respectively, or a situation in a normal region in which the external charge amount and the charge amount state of the battery charge amount are equal to the first reference value and the second reference value, respectively.

11. A charge capacity variable control method using an external energy source for a vehicle, comprising:
an external energy source generating an external charge power;
a main battery receiving the external charge source to be charged;
a controller calculating a change target charge capacity based on an external charge capacity of the external energy source and a battery charge capacity of the main battery depending upon a driving state of the vehicle; and
the controller performing a variable control based on the change target charge capacity,
wherein the variable control is performed under a situation in a high region in which an external charge capacity and a charge capacity state of the battery charge capacity are equal to or greater than a first reference value and a second reference value, respectively, or in a normal region in which the external charge amount and the charge amount state of the battery charge amount are equal to the first reference value and the second reference value, respectively.

12. The charge capacity variable control method of claim 11, wherein the external energy source is a solar cell.

13. The charge capacity variable control method of claim 11, wherein the external charge capacity is a value that is expressed as a percentage by integrating the external charge power charged by the external energy source with a time and then dividing by the battery charge capacity of the main battery.

14. The charge capacity variable control method of claim 11, wherein the variable control is not performed under any one of a full load situation, an idle charge situation, a situation that enters into the idle charge more than once within one driving cycle, a situation in a low region that the charge amount state of the battery charge capacity is equal to or less than the second reference value, and the situation in the low region that the external charge capacity is equal to or less than the first reference value.

15. The charge capacity variable control method of claim 11, wherein the variable control extends an electric vehicle (EV) region by reducing the target charge capacity to be same as the external charge capacity.

16. The charge capacity variable control method of claim 11, wherein the variable control performs an ON/OFF period of an engine by a map that is preset to correspond to the change target charge capacity and a vehicle speed.

17. The charge capacity variable control method of claim 11, wherein the controller uses the external charge power only as the battery charge capacity upon the variable control.

18. The charge capacity variable control method of claim 11, wherein the driving state is any one of a highway driving, a city driving, and a local road driving.

* * * * *